E. L. BONNEFON.
MEASURING FAUCET.
APPLICATION FILED DEC. 30, 1914.
1,219,800.
Patented Mar. 20, 1917.
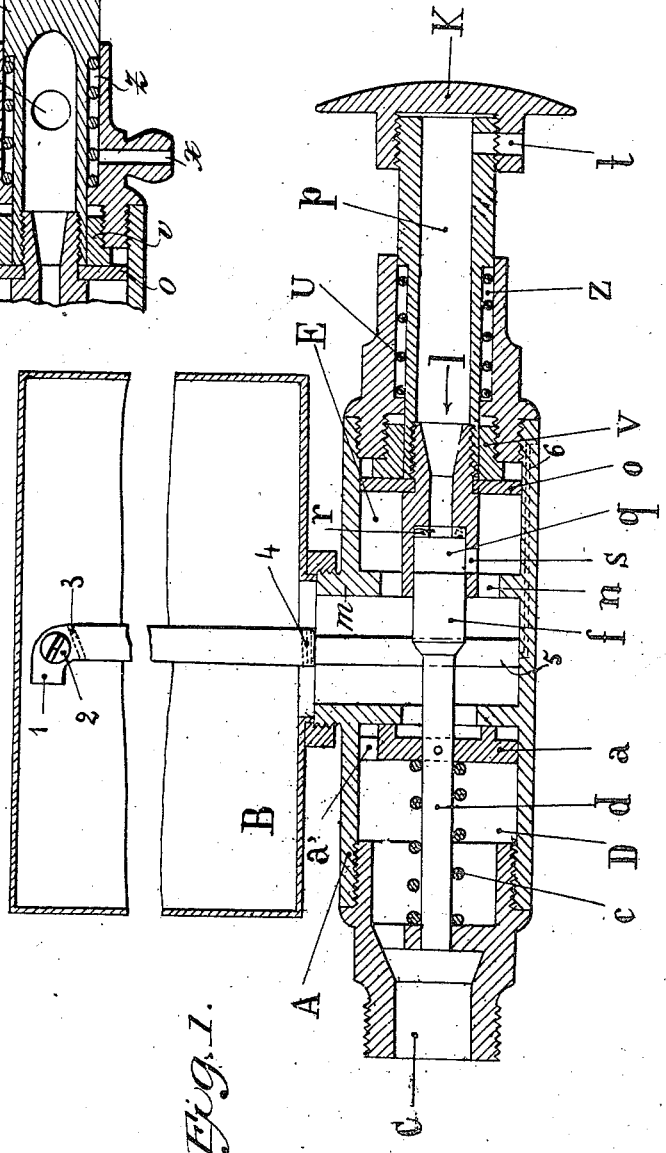
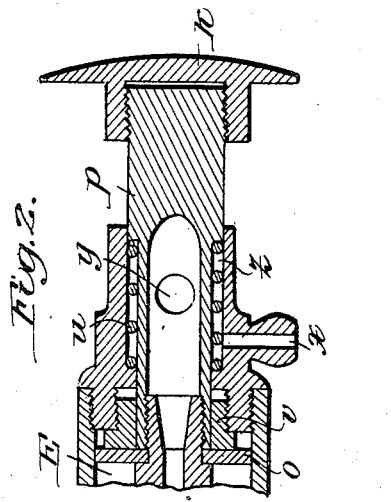
Witnesses.
Samuel Percival
L. Clarkson.
Inventor
Edmond Louis Bonnefon
per
Wheatley MacKenzie
Attorneys.

UNITED STATES PATENT OFFICE.

EDMOND LOUIS BONNEFON, OF GRENOBLE, FRANCE.

MEASURING-FAUCET.

1,219,800.   Specification of Letters Patent.   Patented Mar. 20, 1917.

Application filed December 30, 1914. Serial No. 879,778.

*To all whom it may concern:*

Be it known that I, EDMOND LOUIS BONNEFON, a subject of the Republic of France, residing at 7 Rue Voltaire, Grenoble, Isère, France, have invented a new and useful Measuring-Faucet, of which the following is a specification.

This invention relates to measuring faucets for drawing off water or other liquids in which the liquid is delivered intermittently from a receptacle or measuring vessel interposed between the inlet and outlet of the faucet, and means are provided for controlling the opening of the inlet and outlet in such manner that in the normal position the outlet from the measuring vessel is open and the inlet to the measuring vessel closed and when the outlet is closed the inlet is opened, so that it is impossible for the faucet to be left in a position to allow of a continuous flow of liquid.

According to this invention the measuring faucet comprises a valve casing with an inlet and outlet for liquid, a receptacle interposed between the inlet and outlet, means for putting the receptacle alternately in communication with the inlet and outlet of the valve casing, including a valve adapted to control the opening and closing of the inlet, a hollow manually operated spring plunger formed with an outlet passage, a piston valve arranged to slide in and control the outlet passage in the hollow plunger and a rod rigidly connecting the inlet control valve with the outlet control valve.

The invention is illustrated by way of example in the accompanying drawings, in which Figure 1 is a longitudinal section and Fig. 2 is a section illustrating a slightly modified form of construction.

The measuring vessel B which has a capacity suitable to the maximum quantity that it is desired to obtain at each operation is connected with and situated above a cylindrical valve casing A into which the liquid coming from the main flows at C.

In a compartment D formed in the valve casing A a valve $a$ is mounted on a rod $d$ and pressed toward its seat by a spring $c$ which normally holds the valve in the closed position to prevent liquid entering the measuring vessel B. The casing A has another compartment E containing a piston $o$ mounted on a tubular plunger $p$ to which a longitudinal movement can be imparted by a pusher head $k$ as shown or by any other suitable controlling device.

A spring $u$ assisted by the pressure of the liquid has a constant tendency to press the piston $o$ against the stuffing box $v$. At its inner end the plunger $p$ has a valve controlled outlet passage $q$ in the interior of which a piston valve $f$ on the end of the rod $d$ slides such sliding movement being limited in one direction by an internal shoulder in the plunger provided with a resilient ring $r$. Rod $d$ is only acted upon by the plunger $p$ when this latter has been pushed in the direction of the arrow $l$ to an extent sufficient to cause the ring $r$ to bear against the valve $f$. In the wall of the chamber $q$ is a hole or holes $s$ which can be gradually closed by the valve $f$.

The liquid is delivered either through an opening $t$ formed in the hollow plunger $p$ Fig. 1 or through a delivery nozzle $x$ Fig. 2, provided on the cock in which case an opening $y$ is likewise formed in the hollow plunger $p$ in order to enable the liquid to enter the chamber $z$.

In the position illustrated in Fig. 1 of the accompanying drawing the measuring chamber B is caused to discharge through the openings $n\ s$ and the interior of the hollow plunger $p$. The admission of liquid into the chamber B is moreover prevented during the discharge of the chamber by the valve $a$ that is kept pressed on to its seat under the combined action of the spring $c$ and the pressure of the water in the main.

Action: If the plunger $p$ be actuated so as to move it in the direction of the arrow $l$ the effect of this movement is to close the openings $s$ by the valve $f$ without moving the rod $d$ and to interrupt the communication between the receptacle B and the outlet passage $p$, when the packing ring $r$ has come into contact with the valve $f$. The same movement continuing, the valve $a$ is moved away from its seat and liquid from the main is admitted into the vessel B through the openings $a^1$ in this valve and the vessel B fills. At the end of its stroke the piston $o$ on the plunger $p$ strikes against the partition $m$. Upon removing the pressure from the head $k$ the springs $u$ and $c$ return the parts to the position shown, the valve *a* is closed and the opening or openings *s* leading from the passage *q* are uncovered by the valve *f* allowing the liquid previously admitted into the receptacle B to flow through the openings *n s* and through the interior of the hollow plunger *p* to the delivery outlet. By uncovering the opening or openings *s* to the extent desired it is possible to regulate the outflow of water at will and even to stop this outflow before the receptable B is completely emptied. In the device shown by way of example, the movement of the plunger *p* is effected by pressing on the pusher head K fixed at the outer end thereof; but of course any other arrangement may be adopted.

For venting the measuring chamber an open-ended pipe 1, 4, 5 is employed the upper end 1 of which is located near the top of the measuring chamber or receptacle B, while the lower end 5 communicates either with a narrow outlet passage 6 in the body of the cock as shown or opens directly into the atmosphere. In the top of the pipe a resilient ball 2 may be supported on a diaphragm 3 as shown said ball having a control aperture or passage through it which is closed when the pressure in the measuring chamber reaches a predetermined amount.

What I claim and desire to secure by Letters Patent is:—

1. A waste preventing measuring faucet comprising a valve casing with an inlet and outlet for liquid, a receptacle interposed between the inlet and outlet, means for putting the receptacle alternately in communication with the inlet and outlet of the valve casing, including a valve adapted to control the opening and closing of the inlet, a hollow manually operated spring plunger formed with an outlet passage, a piston valve arranged to slide in and control the outlet passage in the hollow plunger, and a rod rigidly connecting the inlet control valve with the outlet control valve.

2. A waste preventing measuring faucet comprising a valve casing having inlet and outlet compartments, a measuring receptacle outside the valve casing but in communication with same between the inlet and outlet compartments, an inlet valve located between the inlet compartment and the measuring receptacle and adapted to shut off the said receptacle from the inlet compartment, a spring normally holding said valve in the closed position, a hollow manually operated spring plunger arranged in the outlet compartment and formed with an outlet passage, normally in communication with said compartment through a valve controlled opening, a piston valve arranged to control the said outlet passage in the plunger, a rod rigidly connecting the inlet and outlet valves and forming an operative connection between the plunger and inlet valve such that when the outlet is open the inlet is closed and when the inlet is closed the outlet is either closed or open.

3. A waste preventing measuring faucet comprising a valve casing having inlet and outlet compartments, a measuring receptacle outside the valve casing but in communication with same between the inlet and outlet compartments, means for permitting the admission of air to or its escape from the receptacle as the liquid enters and leaves the same, an inlet valve located between the inlet compartment and the measuring receptacle and adapted to shut off the said receptacle from the inlet compartment, a spring normally holding said valve in the closed position, a hollow manually operated spring plunger arranged in the outlet compartment and formed with an outlet passage, normally in communication with said compartment through a valve controlled opening, a piston valve arranged to control the said outlet passage in the plunger, a rod rigidly connecting the outlet and inlet valves and forming an operative connection between the said plunger and inlet valve such that when the outlet is open the inlet is closed and when the inlet is closed the outlet is either closed or open.

4. Apparatus of the character described for delivering liquids comprising in combination: a tubular valve casing with inlet and outlet compartments, a measuring receptacle, an inlet valve controlling communication between the inlet compartment and the measuring receptacle, a spring arranged to normally close the inlet valve, a spring plunger formed with an outlet passage and located in the outlet compartment, a rod rigidly connected at one end with the inlet valve, an outlet valve formed on the other end of the rod rigid therewith extending into the outlet passage in the plunger and controlling communication between the measuring receptacle and the outlet, and a spring acting on the plunger to normally hold same in such position in relation to the outlet control valve that the outlet is open.

5. Apparatus of the character described for delivering liquids comprising in combination; a tubular valve casing with inlet and outlet compartments, a measuring receptacle, an inlet valve controlling communication between the inlet compartment and the measuring receptacle, a spring arranged to normally close the inlet valve, a spring plunger formed with an outlet passage and located in the outlet compartment, a rod rigidly connected with the inlet valve, an outlet valve integral with said rod and extending into the outlet passage in the plunger and controlling communication between the measuring receptacle and the outlet, and a spring acting on the plunger to normally hold same in such position in relation to the outlet control valve that the outlet is open and a vent tube opening into the upper part of the measuring receptacle so as to allow of the movements of the air and capable of serving as a by-pass for liquid substantially as described.

In testimony whereof I affix my signature in presence of two witnesses.

EDMOND LOUIS BONNEFON.

Witnesses:
AUGTEELOTZ,
C. MARTIN.